United States Patent

Jenkins, Jr.

[11] Patent Number: 5,956,980
[45] Date of Patent: Sep. 28, 1999

[54] SAFETY LOCK

[76] Inventor: William O. Jenkins, Jr., P.O. Box 13006, Jackson, Miss. 39236

[21] Appl. No.: 09/229,764

[22] Filed: Jan. 14, 1999

Related U.S. Application Data

[60] Provisional application No. 60/071,610, Jan. 16, 1998.

[51] Int. Cl.⁶ .................................................. E05B 73/00
[52] U.S. Cl. ........................... 70/18; 24/598.5; 24/600.1; 70/14
[58] Field of Search .................................. 70/14, 18, 19, 70/57, 58; 24/598.5, 598.6, 600.1

[56] References Cited

U.S. PATENT DOCUMENTS

| 227,793 | 5/1880 | Kingston | 24/598.5 |
| 712,959 | 11/1902 | Pohlman | 24/598.5 |
| 872,499 | 12/1907 | Cooper | 24/598.5 X |
| 1,197,020 | 9/1916 | Farrar | 70/203 |
| 1,420,949 | 6/1922 | Schindler | 24/598.5 |
| 1,442,043 | 1/1923 | Bosserman | 24/598.5 X |
| 1,472,038 | 10/1923 | Banes | 24/598.5 |
| 1,518,541 | 12/1924 | Nelson | 24/598.5 X |
| 1,523,545 | 1/1925 | Lamb | 24/598.5 X |
| 1,570,865 | 1/1926 | Soucy | 24/600.1 X |
| 1,754,043 | 4/1930 | Port | 24/598.5 |
| 2,401,145 | 5/1946 | Erffmeyer | 24/598.5 X |
| 2,795,024 | 6/1957 | Donaldson | 24/598.5 X |
| 4,085,599 | 4/1978 | Fischer et al. | 70/14 |
| 5,070,712 | 12/1991 | Fox | 70/19 X |
| 5,743,116 | 4/1998 | Suster | 70/14 |

FOREIGN PATENT DOCUMENTS

| 150327 | 9/1937 | Austria | 24/600.1 |

Primary Examiner—Suzanne Dino Barrett
Attorney, Agent, or Firm—Peter A. Borsari

[57] ABSTRACT

A three-piece safety lock for locking any size trailer safety chain to any size vehicle receiver hitch comprising a primary catch, a locking catch and a keeper element. The safety lock includes a positive self-locking mechanism, termed a keeper element, which ensures that any safety connection or attachment will not become detached from the safety lock, particularly while a vehicle is in transit. The keeper element is pivotably secured to and locks a primary catch and a locking catch. Both the primary catch and the locking catch are configured with corresponding catch openings for receiving the length of a chain or similar article. The primary catch also is provided with a cavity for receiving and locking a link of chain.

8 Claims, 5 Drawing Sheets

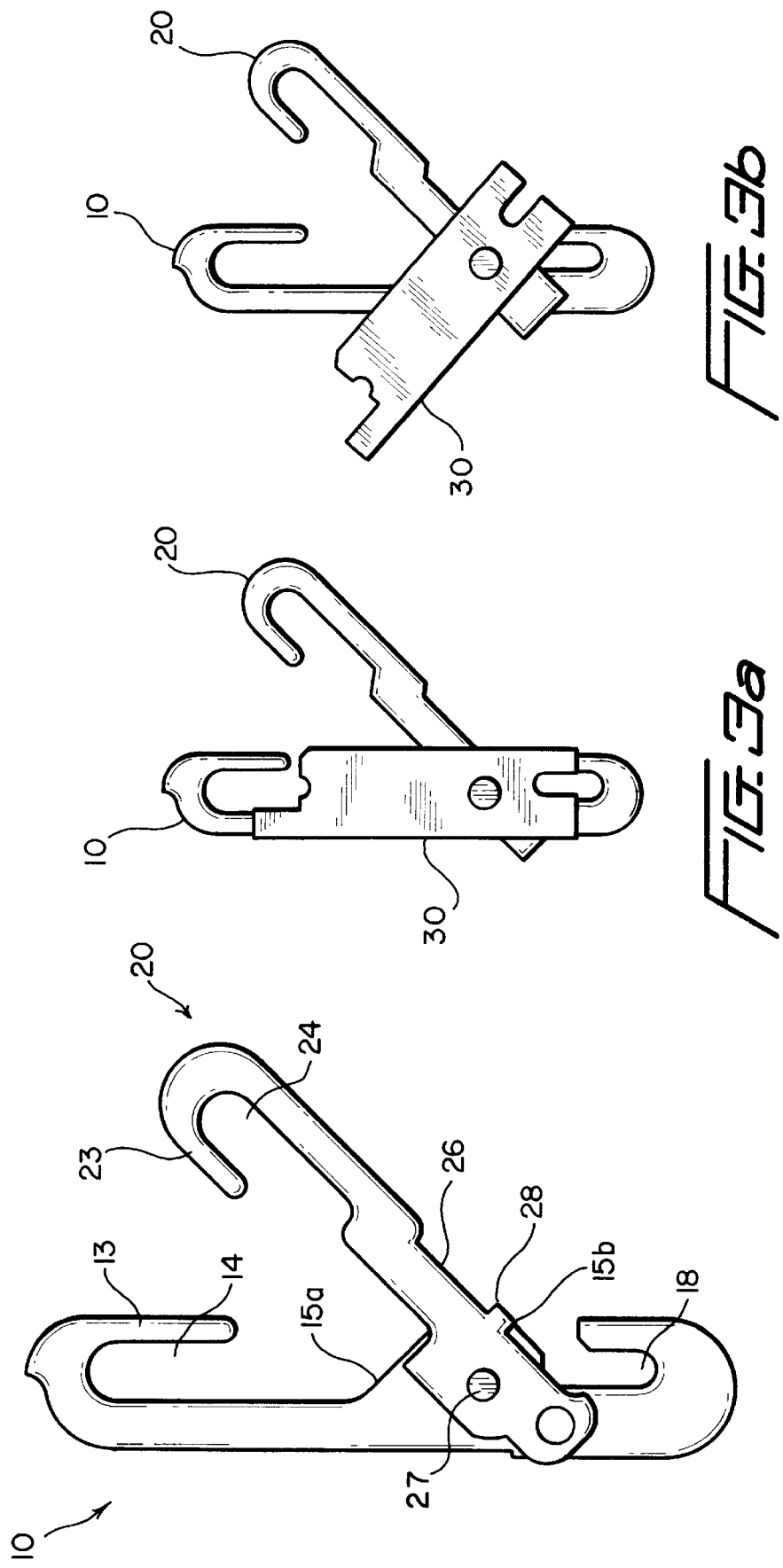

SAFETY LOCK

RELATED APPLICATION

This patent application claims priority from U.S. Provisional patent application Ser. No. 60/071,610, filed Jan. 16, 1998.

FIELD OF INVENTION

The present invention relates to a safety lock device for locking any size trailer safety chains to any size vehicle receiver hitch. More specifically, the safety lock includes a positive self-locking mechanism to ensure that any safety connection or attachment will not become detached from the safety lock, particularly while a vehicle is in transit.

BACKGROUND OF THE INVENTION

For many years, the conventional way to attach a trailer to a vehicle hitch was to utilize a standard "S" hook and chain. However, the "S" hook/chain mechanism, while simple to use, has a number of safety deficiencies. For example, the chain can become detached from the "S" hook quite easily when the vehicle/trailer engages rough terrains, potholes or bumps, and other uneven road surfaces, thereby causing the trailer to become disengaged from the vehicle. In addition, the "S" hook does not enable the user to restrict the amount of slack in the chain, resulting in loose chain between the trailer and the vehicle, which can contribute to the danger of the chain detaching from the "S" hook.

Recently, laws have been enacted mandating certain safety requirements in the manner in which trailers are connected to vehicles. A California statute now requires that "All safety connections and attachments shall have a positive means of ensuring that the safety connection or attachment does not become dislodged while in transit." And further states that "No more slack shall be left in a safety chain than is necessary to permit proper turning". Accordingly, a new safety lock device is required having a positive self-locking mechanism to eliminate the possibility of dislodgement and which enables adjustment to remove unnecessary slack from the safety chain.

SUMMARY OF THE INVENTION

Accordingly, it is an object of the present invention to provide a safety lock having a positive mechanism to ensure that a safety connection or attachment will not become dislodged during transit.

It is another object of the present invention to provide a safety lock having adjusting means to remove unnecessary slack from either end of the safety chain.

It is an additional object of the present invention to provide a safety lock which can accommodate any size trailer safety chain and any size vehicle receiver hitch.

It is a further object of the present invention to provide a safety lock which is simple and inexpensive to manufacture and easy to use to self-lock chains, cables, rebars and similar items.

Additional objects, advantages and novel features of the invention will be set forth in part of the description which follows, and in part will become apparent to those skilled in the art upon examination of the following specification or may be learned by practice of the invention.

BRIEF DESCRIPTION OF THE DRAWINGS

The present invention will be better understood with reference to the appended drawing sheets, where:

FIG. 2 is a side view of the primary catch and locking catch in the open position.

FIG. 3a is a view of the assembled safety lock in a partially open position.

FIG. 3b is a view of the assembled safety lock in the open position.

DETAILED DESCRIPTION

Figure 1:
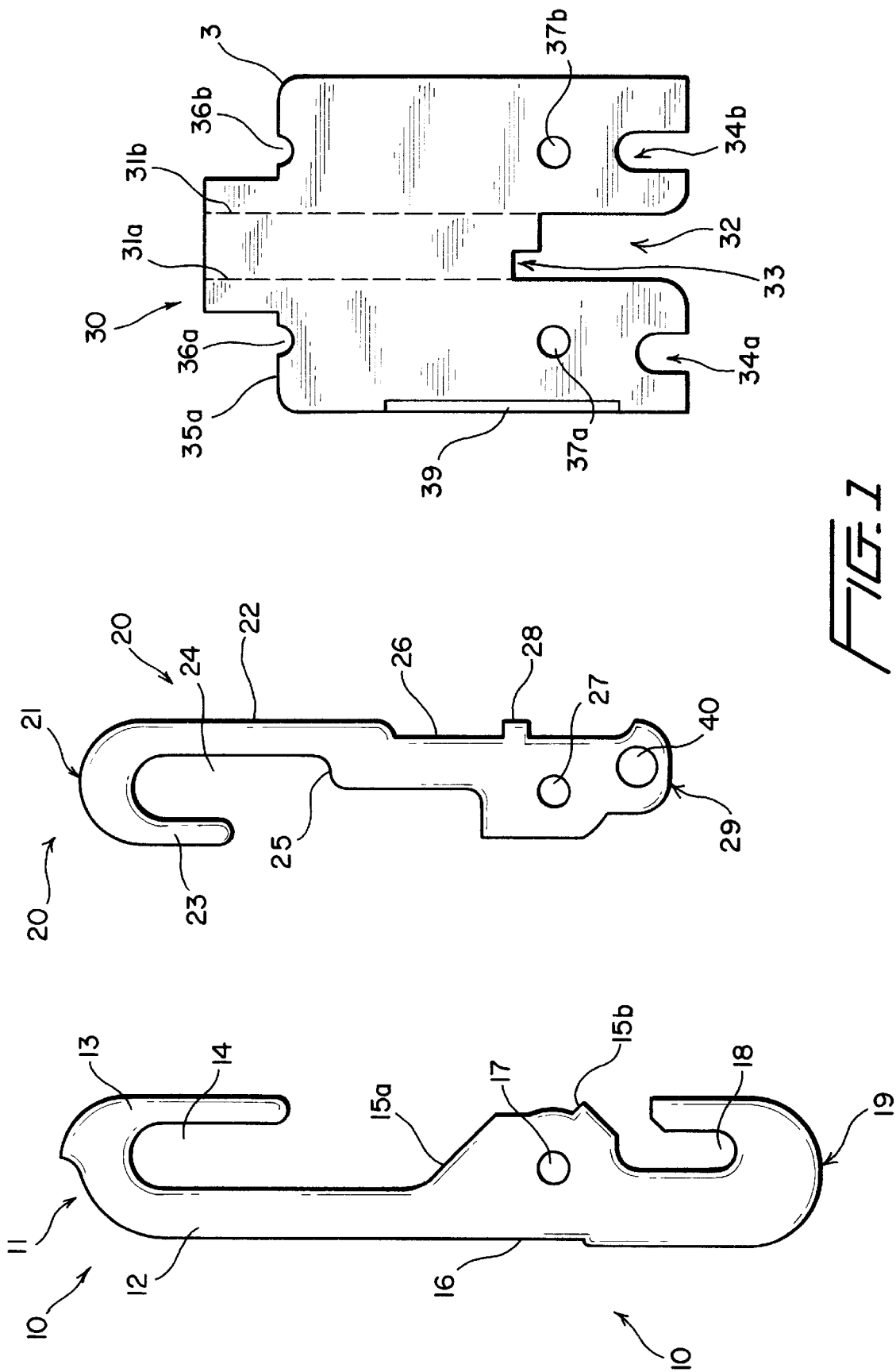
FIG. 1 is a side view of the three elements comprising the safety lock of the present invention.

The present invention relates to a safety lock having a positive self-locking mechanism to ensure that any safety connection or attachment will not become detached from the safety lock. More particularly, the safety lock is a three piece structure comprising a primary catch, a locking catch and a keeper. Referring to FIG. 1, the primary catch 10 comprises a J-shaped first end 11 having a first leg member 12 and a shorter, second leg member 13, the space between the two leg members defining a catch opening 14. The interior surface of first leg member 12 facing the distal end of catch opening 14 is provided with a first slant 15a which accepts an item to be introduced to the catch opening and helps guide it to the catch opening. The mid-section 16 of the first leg member 12 is provided with a center hole 17 of sufficient size to accept a bolt or rivet. The interior surface of the first leg member near the center hole is provided with a second slant 15b. The primary catch 10 further comprises a J-shaped second end 19 having a cavity 18.

Still referring to FIG. 1, the locking catch 20 is similar in structure to primary catch 10 and comprises a J-shaped first end 21 having a first leg member 22 and a shorter, second leg member 23, the space between the two leg members defining a catch opening 24 which corresponds in shape and size to catch opening 14. The interior surface of first leg member 22 facing the distal end of catch opening 24 is provided with a slant 25 which helps guide an item into the catch opening. The first leg member 22 is provided with a center hole 27 towards the lower second end 29 corresponding to center hole 17 and a recess 26 along the exterior surface of the mid-section, the recess being defined at its lower end by a projection or stop 28. Projection 28 is configured in such a manner that is will engage slant 15b of the primary catch when the two catches are in an open position as shown in FIG. 2, thereby preventing further opening of the two catches. The locking catch 20 further comprises a rounded second end 29 having an opening 40. Opening 40 is designed to receive a padlock or similar device.

The third element of the safety lock of the present invention is a keeper 30 as shown in FIG. 1. The keeper is shown in an unbent form for illustrative purpose. However, it is to be understood that the keeper will be folded or bent at 90° at hash lines 31a and 31b in actual use. The keeper 30 comprises a pair of openings 37a and 37b which when the keeper is folded, will correspond to center holes 17 and 27 of the primary catch and locking catch respectively. In this manner, a bolt, rivet or similar article can be introduced through opening 37a, center hole 17, center hole 27 an opening 37b, thereby pivotally joining the primary catch, secondary catch and keeper elements as shown in FIGS. 3a and 3b. The keeper further includes a recess 32 having a cavity 33. The recess 32 and cavity 33 are designed to allow for the limited opening or pivoting of the keeper and the primary and locking catches within a prescribed arc. Thus, when the keeper is pivoted open, its recess and cavity will engage the lower end of the locking catch and be prevented from opening further. The keeper also is provided with corresponding keeper slots 34a and 34b which accept the item and guide it to the cavity 18 of the primary catch 10. The keeper may be fashioned with rounded shoulders 35a and 35b to enable smooth locking and unlocking of the item within the catch opening. The shoulders may further include matching recesses 36a and 36b corresponding to the curvature of the catch opening. In addition, the outer surface of the keeper 30 may be configured with grooves 38 or the like in order to provide a easier gripping surface, while the inner surface of the keeper may be configured with a ridge 39 which can engage the recess 26 of the locking catch to secure the keeper to the primary and locking catches.

The three elements of the safety lock are secured together prior to use. The center hole 17 of the primary catch 10 is aligned with the center hole 27 of the locking catch 20 as shown in FIG. 2. The primary and locking catches are then introduced within the folded keeper 30 such that the center holes 17 and 27 are in alignment with openings 37a and 37b. A bolt, rivet or similar article is then disposed with the center holes and openings in order to pivotally secure the three elements together, as shown in FIGS. 3a and 3b. Both the primary catch and locking catch can be manufactured from any suitable material which is rigid and durable, preferably metal. The keeper is manufactured from either metal or a durable plastic material.

Figure 4B:
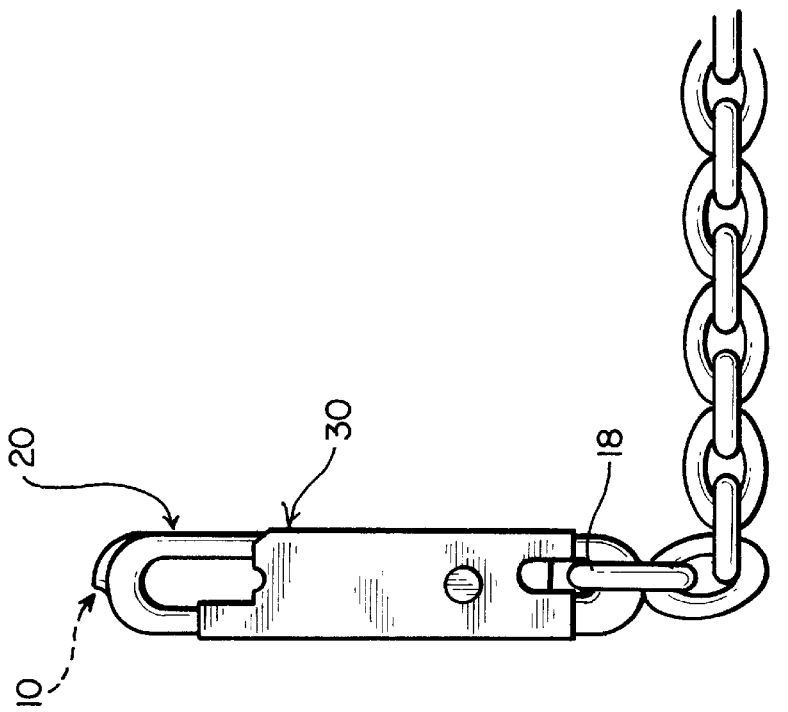
FIGS. 4a to 4f are side views illustrating the steps of operation of the safety lock.
Figure 4A:
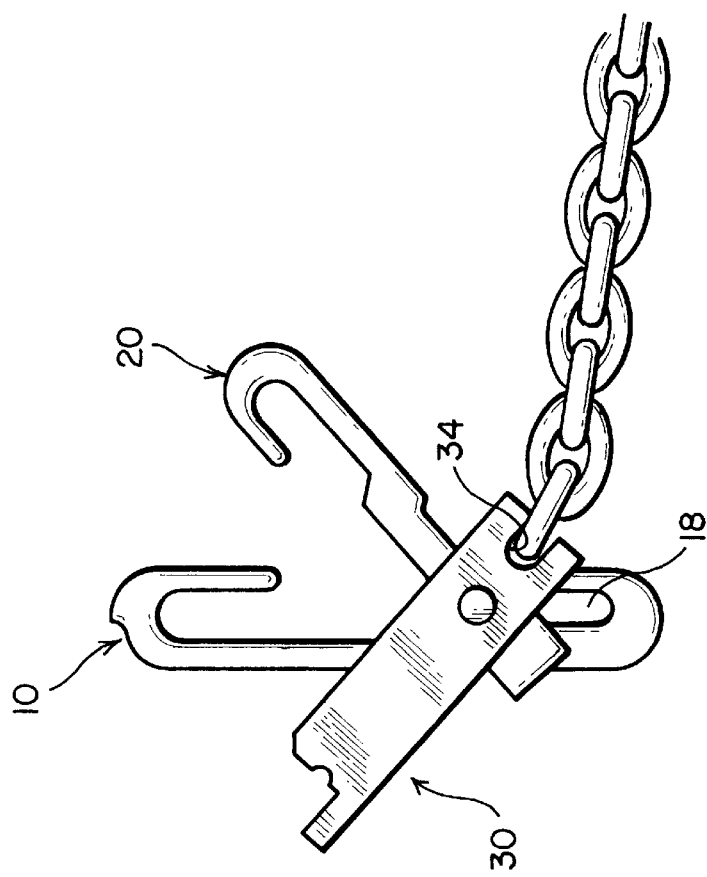
Figure 4D:
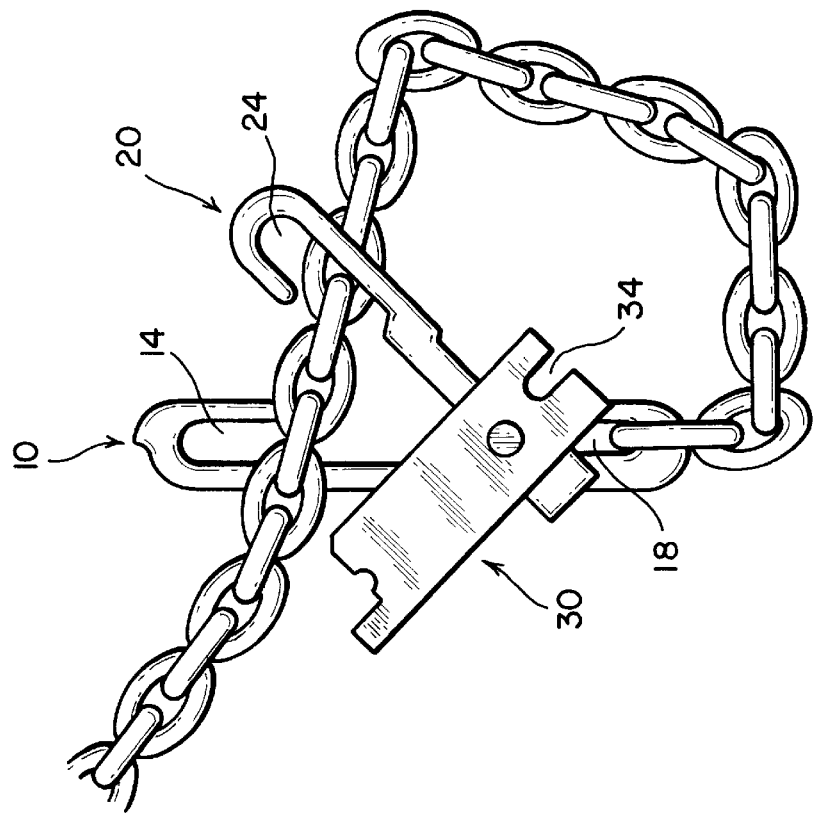
Figure 4C:
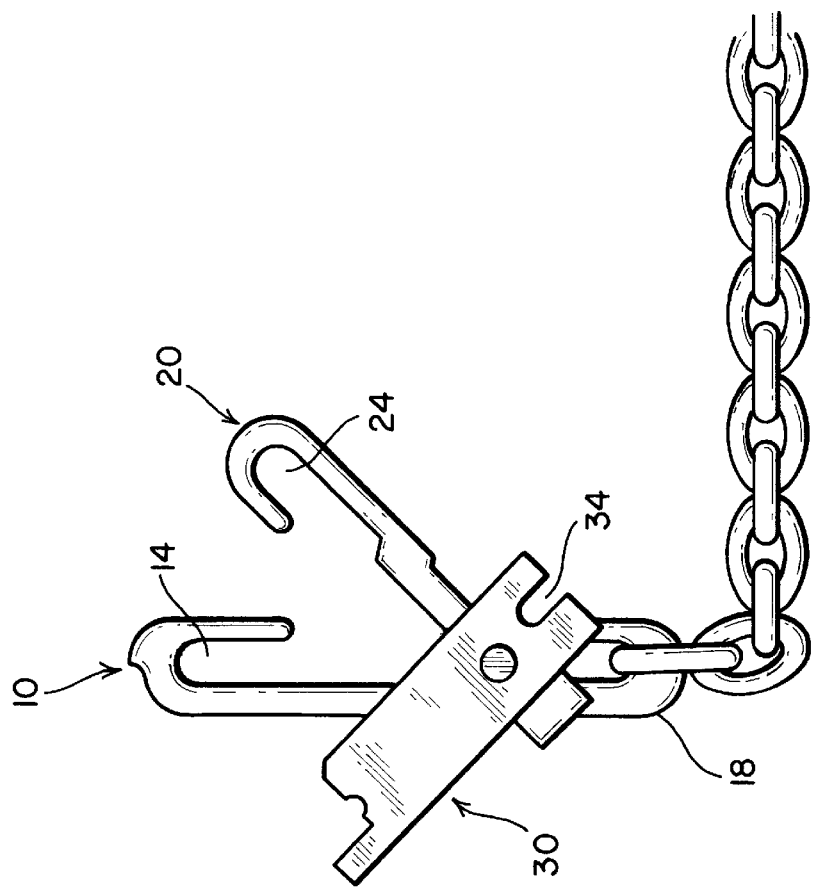
Figure 4F:
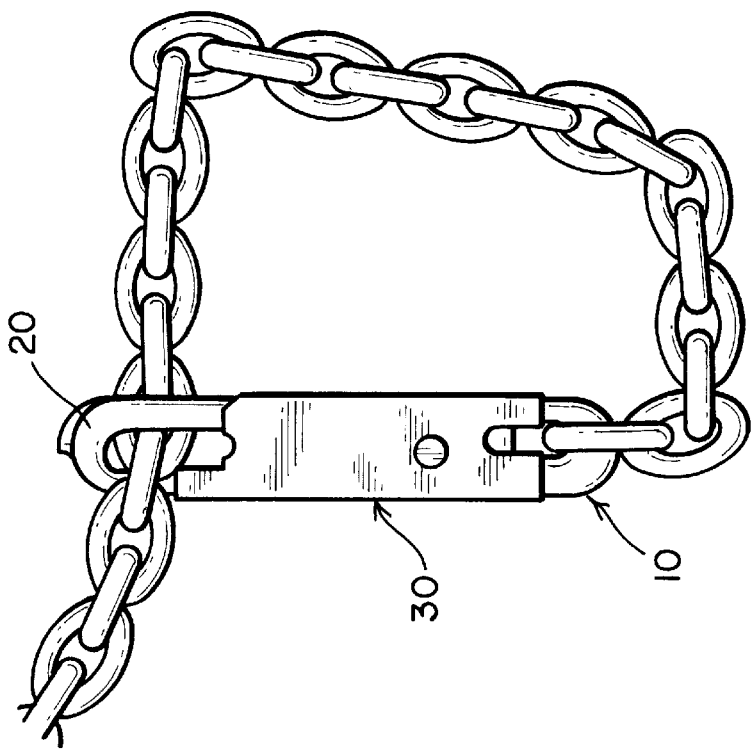
Figure 4E:
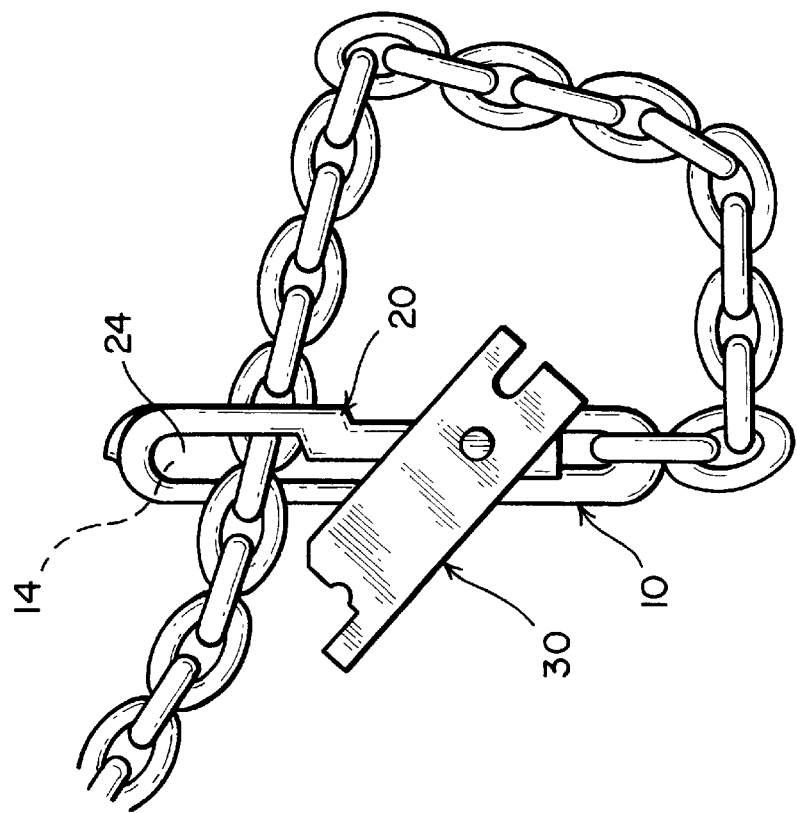

FIGS. 4a to 4f depict the operation of the safety lock of the present invention for securing a chain thereto. However, it is to be understood that a chain is but one of several items which may be secured to the safety lock. Thus, the following description of operation is intended merely to be illustrative and the present invention should not be considered as limited to securing a safety chain. Referring to FIG. 4a, the safety lock is opened and a chain link is inserted into the keeper slot 34 and guided into cavity 18 of the primary catch as shown in FIG. 4b by closing of the keeper 30 and locking catch 20. Next, the safety lock is opened as shown in FIGS. 4c and the chain is inserted within the catch openings 14 and 24 of the primary catch and locking catch respectively as shown in FIG. 4d. The primary catch and locking catch then are closed around the chain thereby closing the catch openings as shown in FIG. 4e and the keeper 30 is closed over the primary and locking catches as shown in FIG. 4f, thereby locking the chain within the catch opening.

While particular embodiments of the invention have been described, it will be understood, of course, that the invention is not limited thereto, and that many obvious modifications and variations can be made, and that such modifications and variations are intended to fall within the scope of the appended claims.

What is claimed is:

1. A three piece safety lock consisting of a primary catch, a locking catch and a keeper element, the primary catch comprising a J-shaped first end having a first leg member and a second leg member, a second end, a catch opening between said first leg member and said second leg member, said first leg member having a mid-section having a center hole, and a keeper slot disposed within said second end, the locking catch comprising a J-shaped first end having a first leg member and a second leg member, a second end, a catch opening between said first leg member and said second leg member, said first leg member having a a mid-section having a center hole and an exterior surface, said exterior surface of said mid-section tapering into a recessed area and having a projection extending from said recessed area, and the keeper element comprising an upper end, a lower end, a pair of openings, and a recess having a secondary cavity disposed at said lower end, wherein said primary catch, said locking catch and said keeper element can be pivotably secured to each other through said center hole of said primary catch, said center hole of said locking catch and said pair of openings of said keeper element to form said safety lock in such a manner that said safety lock can be opened and closed.

2. The safety lock in accordance with claim 1, wherein said primary catch further comprises a first slant disposed on said first leg member to facilitate guiding an item into said catch opening.

3. The safety lock in accordance with claim 1, wherein said locking catch further comprises a slant disposed on said first leg member to facilitate guiding an item into said catch opening.

4. The safety lock in accordance with claim 1, wherein said primary catch further comprises a second slant disposed on said mid-section of said first leg, said second slant configured in such a manner that it will engage said projection of said first leg of said locking catch in order to restrict the degree of opening between the primary catch and the locking catch.

5. The safety lock in accordance with claim 1, wherein said keeper element further comprises a ridge which is configured in such a manner to engage said recess along the exterior surface of said mid-section of said locking catch in order to lock said keeper element to said locking catch.

6. The safety lock in accordance with claim 1, wherein said upper end of said keeper element further comprises rounded shoulders, said shoulders further comprising recesses corresponding to the curvature of the catch openings of the primary catch and locking catch.

7. A safety lock consisting of a primary catch, a locking catch and a keeper element, the primary catch comprising a J-shaped first end having a first leg member and a second leg member, a second end, a catch opening between said first leg member and said second leg member, said first leg member having a mid-section having a center hole, and a keeper slot disposed within said second end, the locking catch comprising a J-shaped first end having a first leg member and a second leg member, a second end, a catch opening between said first leg member and said second leg member, said first leg member having a mid-section having a center hole and an exterior surface, said exterior surface of said mid-section tapering into a recessed area and having a projection extending from said recessed area, and the keeper element comprising a back wall and a pair of parallel arms extending from said back wall, each arm having a center hole, an upper end and a lower end, each of said upper ends of said arms comprising recesses corresponding to the curvature of the catch openings of the primary catch and locking catch, each of said lower ends of said arms being provided with a keeper slots, said keeper slots of said arms corresponding to said keeper slot of said primary catch;

wherein said primary catch, said locking catch and said keeper element can be pivotably secured to each other through said center holes of said primary catch, said locking catch and said parallel arms.

8. The safety lock in accordance with claim 7, wherein a chain can be locked within said safety lock by inserting a chain link into said keeper slot of said primary catch and inserting the chain length within said catch openings of said primary catch and said locking catch when said primary catch and said locking catch are in an position, closing said primary catch and said locking catch and then closing said keeper element.

* * * * *